H. PODOLSKY.
TRAP FOR FISH.
APPLICATION FILED MAR. 24, 1921.
1,427,321.
Patented Aug. 29, 1922.
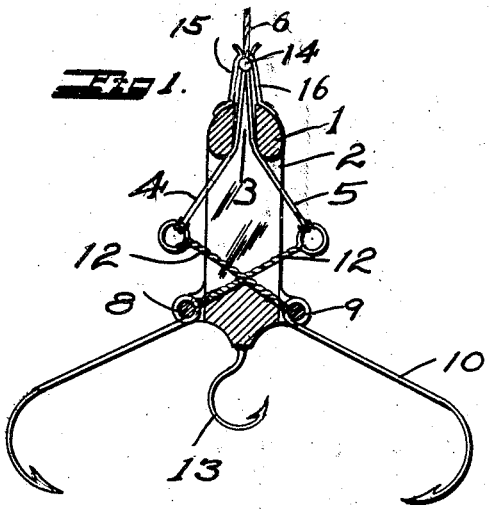
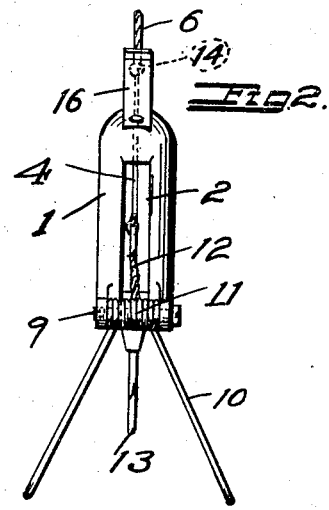
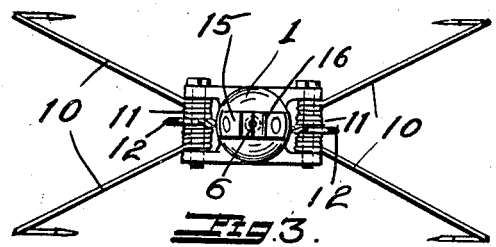
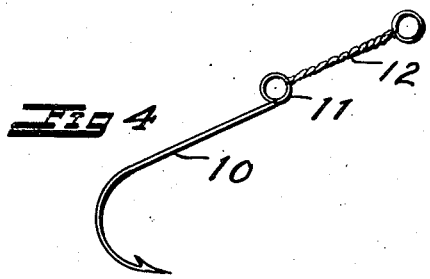
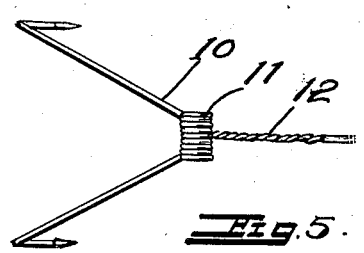
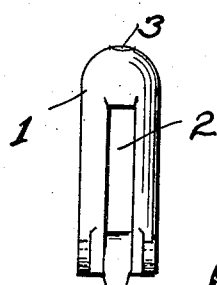
INVENTOR.
Henry Podolsky
BY
Carlos P. Griffin
ATTORNEY.

UNITED STATES PATENT OFFICE.

HENRY PODOLSKY, OF SAN FRANCISCO, CALIFORNIA.

TRAP FOR FISH.

1,427,321.  Specification of Letters Patent.  Patented Aug. 29, 1922.

Application filed March 24, 1921.  Serial No. 455,081.

*To all whom it may concern:*

Be it known that I, HENRY PODOLSKY, a citizen of the United States, residing at San Francisco, in the county of San Francisco, State of California, have invented a new and useful Trap for Fish, of which the following is a specification in such full and clear terms as will enable those skilled in the art to construct and use the same.

This invention relates to a trap for fish and its object is to produce an apparatus which will securely hook the fish once a strike has been made.

It will be understood by those skilled in the art that often a fish is lost from a hook because the hook is not securely caught in the mouth of the fish. With the present invention, the slightest strike will cause the trap hooks to engage the fish, and the more the pull is, the tighter the hooks hold up to the breaking point of hooks or line.

Another object of the invention is to provide the trap with means to hold the bait, which will lie between the trap hooks, thereby making certain that the trap hooks will grab the fish in such a manner as to securely hold it.

Fig. 1 is a sectional view of the hook holder showing three of the hooks.

Fig. 2 is a view of the complete trap looking at right angles to Fig. 1.

Fig. 3 is a plan view of the trap.

Fig. 4 is a side elevation of one of the trap hooks.

Fig. 5 is a plan of one of the trap hooks, and

Fig. 6 is a side view of the hook holder with the hooks removed.

The hook holder consists of a small lead weight 1 with a longitudinally extending slot 2, at the top of which is an opening 3 for the two fish lines 4 and 5 which are joined to the main line 6.

Adjacent to the lower part of the weight there are two pivot pins 8 and 9, each carrying a double hook 10. The hooks 10 are made with a coiled portion 11 surrounding the pivots and a twisted portion 12, to which the cords 4 and 5 are connected. The weight 1 has a smaller hook 13 which carries the bait.

The larger hooks 10 of which there are two, are held apart by having the small ball 14 at the end of the cord 6 held between two light springs 15 and 16 at the top of the weight 1, the cords 4 and 5 being made of wire cable, catgut, or some other material stiff enough to hold the hooks up lightly as shown in Fig. 1. Whenever a fish strikes the bait, the sudden jerk on the cord disengages the ball 14 and causes the double hooks to engage the fish on both sides of its head, thereby securely holding it.

Having thus described my invention which I claim as new and desire to secure by Letters Patent of the United States, is as follows:

A trap for fish comprising a weighted hook, pivoted hooks carried thereby, means to cause the pivoted hooks to stand normally away from the weighted hook, a line connecting the upper portion of the pivoted hooks with the main fishing line, spring retaining means to hold the pivoted hooks extended from the weighted hook and in a fixed position with respect to the main line when swinging freely or adapted to release the pivoted hooks and allow them to swing toward each other when a fish engages the weighted hook.

In testimony whereof I have hereunto set my hand this 12" day of March, A. D. 1921.

HENRY PODOLSKY.